United States Patent
Bergius et al.

(10) Patent No.: US 10,299,099 B2
(45) Date of Patent: May 21, 2019

(54) EMERGENCY CALL HANDLING USING OVER-THE-TOP SERVICES

(71) Applicant: Nokia Technologies Oy, Espoo (FI)

(72) Inventors: Hannu Bergius, Kangasala (FI); Jani J. Mäenpää, Kaivanto (FI)

(73) Assignee: Nokia Technologies Oy, Espoo (FI)

( * ) Notice: Subject to any disclaimer, the term of this patent is extended or adjusted under 35 U.S.C. 154(b) by 3 days.

(21) Appl. No.: 15/511,337

(22) PCT Filed: Sep. 17, 2014

(86) PCT No.: PCT/US2014/056032
§ 371 (c)(1),
(2) Date: Mar. 15, 2017

(87) PCT Pub. No.: WO2016/043728
PCT Pub. Date: Mar. 24, 2016

(65) Prior Publication Data
US 2017/0289783 A1     Oct. 5, 2017

(51) Int. Cl.
*H04W 4/90*     (2018.01)
*H04W 48/18*    (2009.01)
(Continued)

(52) U.S. Cl.
CPC ............ *H04W 4/90* (2018.02); *H04W 76/50* (2018.02); *H04W 48/18* (2013.01); *H04W 84/042* (2013.01); *H04W 88/005* (2013.01)

(58) Field of Classification Search
CPC ... H04W 4/22; H04W 76/007; H04W 84/042; H04W 88/005
See application file for complete search history.

(56) References Cited

U.S. PATENT DOCUMENTS

| 8,254,877 B2 * | 8/2012 | Edge | H04W 4/90 |
|---|---|---|---|
| | | | 455/404.2 |
| 8,548,125 B2 | 10/2013 | Liik et al. | |
| | | (Continued) | |

OTHER PUBLICATIONS

International Search Report and Written Opinion received for corresponding Patent Cooperation Treaty Application No. PCT/US2014/056032, dated Aug. 6, 2015, 9 pages.

(Continued)

*Primary Examiner* — Babar Sarwar
(74) *Attorney, Agent, or Firm* — Mintz Levin Cohn Ferris Glovsky and Popeo, P.C.

(57) ABSTRACT

Methods and apparatus, including computer program products, are provided for emergency call handling. In one aspect there is provided a method. The method may include receiving, at a user equipment, an indication from a network, the indication representative of at least one of whether a carrier grade voice over cellular packet data call is available at a cell serving the user equipment or whether an over-the-top service is available at the cell serving the user equipment; and initiating, by the user equipment based on the received indication from the network, a call via the over-the-top service, when the indication represents the carrier grade voice over cellular packet data call is not available at the cell serving the user equipment and the over-the-top service is available at the cell serving the user equipment. Related apparatus, systems, methods, and articles are also described.

20 Claims, 6 Drawing Sheets

(51) Int. Cl.
*H04W 76/50* (2018.01)
*H04W 84/04* (2009.01)
*H04W 88/00* (2009.01)

(56) References Cited

U.S. PATENT DOCUMENTS

| | | | | |
|---|---|---|---|---|
| 9,185,216 | B2* | 11/2015 | Purnadi | H04M 3/5116 |
| 9,307,486 | B2 | 4/2016 | Tanikawa et al. | |
| 9,554,364 | B2 | 1/2017 | Takeda et al. | |
| 2007/0153983 | A1* | 7/2007 | Bloebaum | H04M 3/42357 379/33 |
| 2007/0153986 | A1* | 7/2007 | Bloebaum | H04M 7/0057 379/45 |
| 2007/0167167 | A1 | 7/2007 | Jiang | |
| 2007/0298765 | A1* | 12/2007 | Dickinson | H04M 7/1235 455/410 |
| 2008/0009262 | A1 | 1/2008 | Rudolf et al. | |
| 2009/0154397 | A1* | 6/2009 | Akhtar | H04L 47/782 370/328 |
| 2009/0209224 | A1* | 8/2009 | Borislow | H04M 1/72536 455/404.1 |
| 2011/0171926 | A1* | 7/2011 | Faccin | H04W 48/18 455/404.1 |
| 2012/0040662 | A1 | 2/2012 | Rahman et al. | |
| 2014/0020060 | A1 | 1/2014 | Kotecha et al. | |
| 2014/0086177 | A1* | 3/2014 | Adjakple | H04W 12/08 370/329 |
| 2014/0248848 | A1* | 9/2014 | Mufti | H04W 76/10 455/404.1 |
| 2016/0150574 | A1* | 5/2016 | Edge | H04L 61/2564 455/404.2 |
| 2016/0212653 | A1* | 7/2016 | Wang | A61B 10/0051 |
| 2017/0374538 | A1* | 12/2017 | Gellens | H04W 4/90 |

OTHER PUBLICATIONS

"VoLTE with SRVCC: The second phase of voice evolution for mobile LTE devices." Google, Qualcomm, Oct. 2012, www.google.co.in/url?sa=t&rct=j&q=&esrc=s&source=web&cd=4&ved=0CEUQFjAD&url=http%3A%2F%2Fwww.qualcomm.com%2Fmedia%2Fdocuments%2Ffiles%2Fsrvcc-white-paper.pdf&ei=nhxfU6aSOsq-uAT9zIHADg&usg=AFQjCNFCKZHRILIAjGKLHn9qWXhM0_hI6Q&sig2=NOYWXbYUAMruJmx85WJVSg&bvm=bv.65397613%2Cd.c2E&cad=rja.

3GPP, "Technical Specification Group Core Network and Terminals; Non-Access-Stratum (NAS) protocol for Evolved Packet System (EPS); Stage 3 (Release 12)," 3rd Generation Partnership Project, 3GPP TS 24.301 V12.5.0, Jun. 2014.

Jantze, Mike. "Making a google voice call with 100% wifi, and no cell coverage or 4G network available?" Google Groups, Google, Nov. 18, 2013, productforums.google.com/forum/#!topic/voice/-sxfNW78xtM.

* cited by examiner

EMERGENCY CALL HANDLING USING OVER-THE-TOP SERVICES

RELATED APPLICATION

This application was originally filed as Patent Cooperation Treaty Application No. PCT/US2014/056032 filed Sep. 17, 2014.

FIELD

The subject matter described herein relates to wireless communications and, in particular, call handling.

BACKGROUND

Long Term Evolution (LTE) may support packet switching in an Internet Protocol network. But some wireless radio access technologies, such as second generation (2G), third generation (3G), and the like, support circuit switched calls for voice. In LTE, voice over LTE (VoLTE) may be used to carry voice calls. VoLTE uses the Internet Protocol Multimedia System (IMS) network with certain profiles for handling control and media planes of voice service on LTE as packet switched data flows. Unlike mobile voice over internet protocol applications, VoLTE provides native user equipment (UE) support, which enables prioritization with respect to other packet data flows. GSMA IR.92, IMS Profile for Voice and SMS, Version 7.0, 3 Mar. 2013, describes an example implementation of VoLTE in which an IMS profile is used for voice and short message service.

SUMMARY

Methods and apparatus, including computer program products, are provided for emergency call handling.

In some example embodiments, there is provided a method. The method may include receiving, at a user equipment, an indication from a network, the indication representative of at least one of whether a carrier grade voice over cellular packet data call is available at a cell serving the user equipment or whether an over-the-top service is available at the cell serving the user equipment; and initiating, by the user equipment based on the received indication from the network, a call via the over-the-top service, when the indication represents the carrier grade voice over cellular packet data call is not available at the cell serving the user equipment and the over-the-top service is available at the cell serving the user equipment. In some example embodiments, there may be provided method.

In some variations, one or more of the features disclosed herein including the following features can optionally be included in any feasible combination. The call initiated via the over-the-top service may take place after a failure of at least one of a circuit switched fall back call or the carrier grade voice over cellular packet data call. The call initiated via the over-the-top service may be initiated without waiting for a failure of at least one of a circuit switched fall back call or a carrier grade voice over cellular packet data call. The user equipment may send a position of the user equipment. The initiated call may be an emergency call, wherein the position of the user equipment enables routing of the emergency call to an emergency call center serving the position of the user equipment. The sending of the position may take place during establishment of the over-the-top service with the user equipment. The received indication may include at least one of an emergency bearer services indicator, an internet protocol multimedia system voice over packet switched session indicator, an over-the-top service allowed indicator, or an over-the-top service type indicator. The indicator may be carried by at least one of a broadcasted radio resource control signaling, a system information broadcast a dedicated radio resource control signaling, a radio resource control connection release message, or a network access stratum signaling. The indicator may be associated with a list of one or more cells in which the carrier grade voice over cellular packet data call is not available and the over-the-top service is available. The carrier grade voice over cellular packet data call may include at least one of a voice over long term evolution call or voice having a service profile in an internet protocol multimedia system.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

In some example embodiments, the subject matter disclosed herein may relate to call handling and, in particular, normal and/or emergency call handling, in an area where circuit switched fallback (CSFB) or voice over Long Term Evolution (VoLTE) are not available.

Figure 1:
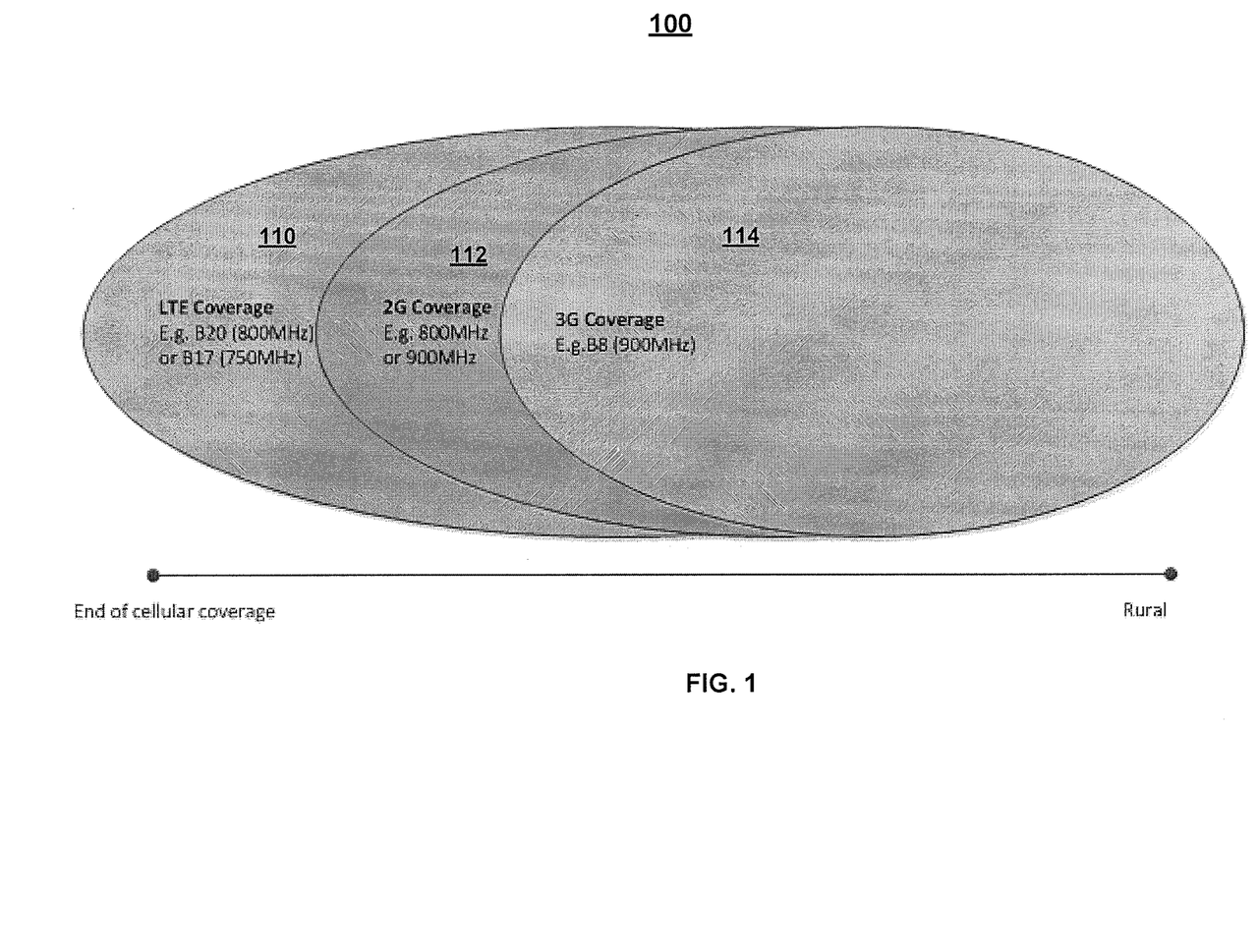
FIG. 1 depicts an example system including different types of networks 110-114, in accordance with some example embodiments.

FIG. 1 depicts an example system 100 including different types of coverage areas 110-114, in accordance with some example embodiments. The system 100 may include for example an LTE radio access network (RAN) 110 (for example, LTE B20 at 800 MHz or B17 at 750 MHz), and this LTE RAN 110 may have a coverage area that is larger than other types of existing networks, such as a second generation (2G) wireless radio access network 112 or a third generation (3G) wireless radio access network 114. In a rural area for example, LTE RAN 110 may have a longer range due to LTE RAN operation at a lower frequency, which may result in a longer range when compared to higher frequency operation. However, LTE RAN 110 may not, in some system deployments, be configured with VoLTE (for example, when the mobile network operator chooses to not deploy VoLTE). When VoLTE is not available, it may lead to a situation where a user equipment (UE) has LTE service (or 4G, for example) in a home public land mobile network (HPLMN), but is unable to make normal or emergency calls via VoLTE or circuit switch fall back (CSFB). This situation may occur in networks where network providers do not deploy CSFB or ramp down CSFB coverage, creating holes in CSFB coverage. Further, if network 110 deploys VoLTE in LTE RAN 110, a non-VoLTE capable UE may not be able to make normal or emergency calls because of the lack of VoLTE support at the UE when the UE is outside of 2G or 3G coverage.

In some example embodiments, a UE may be signaled by the network with information indicating one or more areas (for example, cells, tracking areas, and the like) where VoLTE service is not available but over-the-top (OTT) content or service is available. An OTT service is a service, such as voice, video, or other media, provided over the Internet. An example of an OTT service is Skype, in which the voice service is provided on top of the wireless and/or wired network provided by mobile and/or wired service providers.

Based on the signaled availability information for the OTT service, the UE may then route voice calls, such as normal calls and/or emergency calls, automatically via the OTT service in the area indicated as not having VoLTE service but having OTT service for voice using an LTE data connection.

Although some of the examples refer to automatically or programmatically using the OTT service for voice in locations where VoLTE service is signaled by the network as not available, the OTT voice service may be used automatically or programmatically when 2G and/or 3G services create holes in CSFB coverage as noted above. Furthermore, although some of the examples described herein refer to LTE, specific LTE frequencies, and certain types of OTT services, the subject matter disclosed herein may be used with other radio access technologies, frequencies, and types of services as well. Moreover, although some of the examples refer to VoLTE, VoLTE is merely an example technology as other carrier grade voice over cellular packet data technologies including voice having an IMS profile may be used as well.

Figure 2:
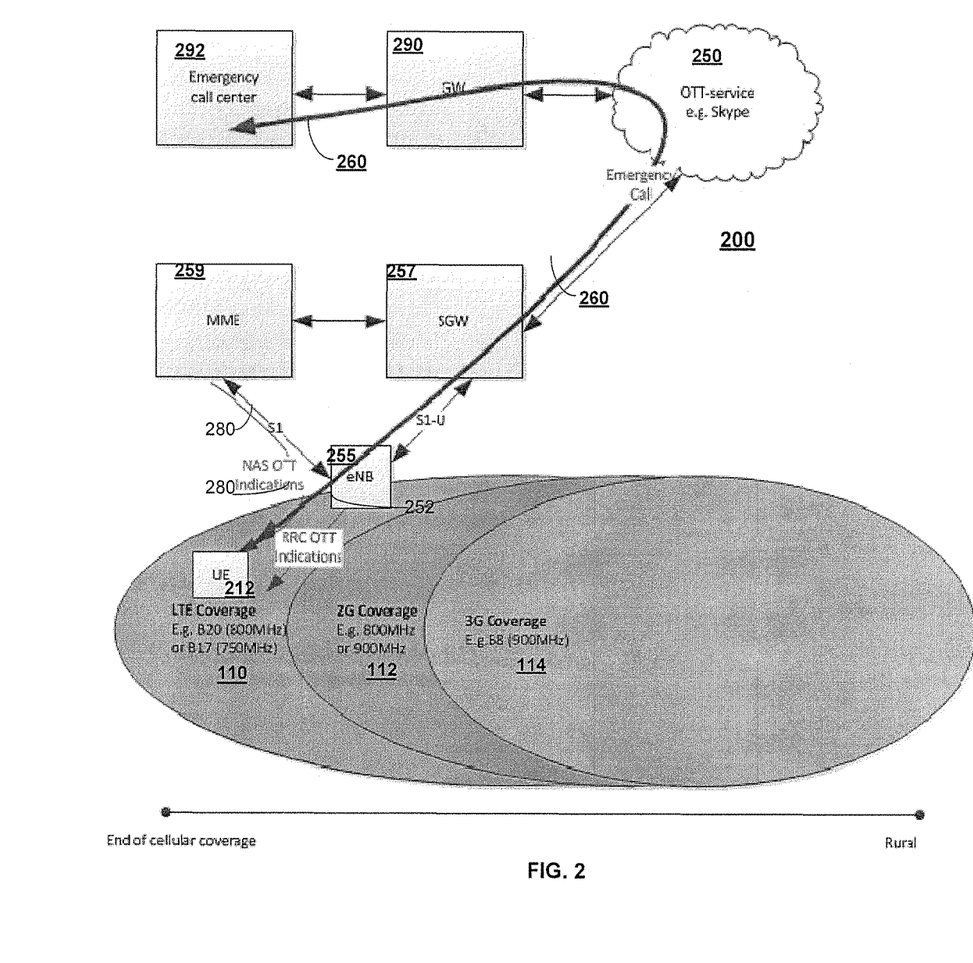
FIG. 2 depicts an example system including an over-the-top (OTT) service in which an emergency call is made, in accordance with some example embodiments.

FIG. 2 depicts an example system 200 including an OTT service 250, in accordance with some example embodiments.

In the example of FIG. 2, a network node, such as a mobility management entity (MME) 259 may send an indication 280 to the base station 255 and UE 212 that VoLTE service is not available but an over-the-top (OTT) service 250 (for example, Skype and/or any other web media service) is available in the network or the cell associated with base station 255. This indication 280 may comprise NAS (network access stratum) signaling. Alternatively or additionally, base station 255 may send an indication 252 to the UE 212, and the indication 252 may signal UE 212 that VoLTE service is not available but an over-the-top (OTT) service 250 is available in the network/cell being serviced by base station 255. The indication signaled at 252 may be carried by radio resource control (RRC) signaling. Alternatively or additionally, the UE may detect (without being signaled by the network at 252 for example,) that VoLTE service is not available but an over-the-top (OTT) service 250 is available in the network/cell serving the UE.

In response to the received signaling 252 and/or 280, UE 212 may then route voice calls, such as normal calls and/or emergency calls programmatically or automatically via OTT service 250. In the example of FIG. 2, UE 252 (which may include a corresponding program, application, and/or application-level interface to OTT service 250) may route an emergency call 260 to the OTT service 250 via base station 255 and serving gateway (SGW) 257. Given that it is an emergency call, the OTT service 250 may then route, based on the location or position of UE 212, the call via gateway 290 to an emergency call center 292 serving the location/ position of UE 212. In this way, UE 212 may be able to make an emergency call in LTE radio access network 110 despite VoLTE not being available.

In some example embodiments, the UE's location information may be used alone or with other information to determine the location or position of the UE. The UE location may then be provided to the network and/or an emergency call-handling center. For example, UE 212 may provide to the network (including OTT service 250) location information, such as global positioning information, representative of the UE's current location, and this location may be provided to the network/OTT service during OTT call setup, although it may be provided at other times as well. For example, the UE may provide the UE's location information to the network (including OTT service 250, the emergency call center 292, and/or other nodes as well) during OTT call set up to enable emergency call setup to be routed geographically to a correct emergency call center 292, as shown at FIG. 2.

Figure 3:
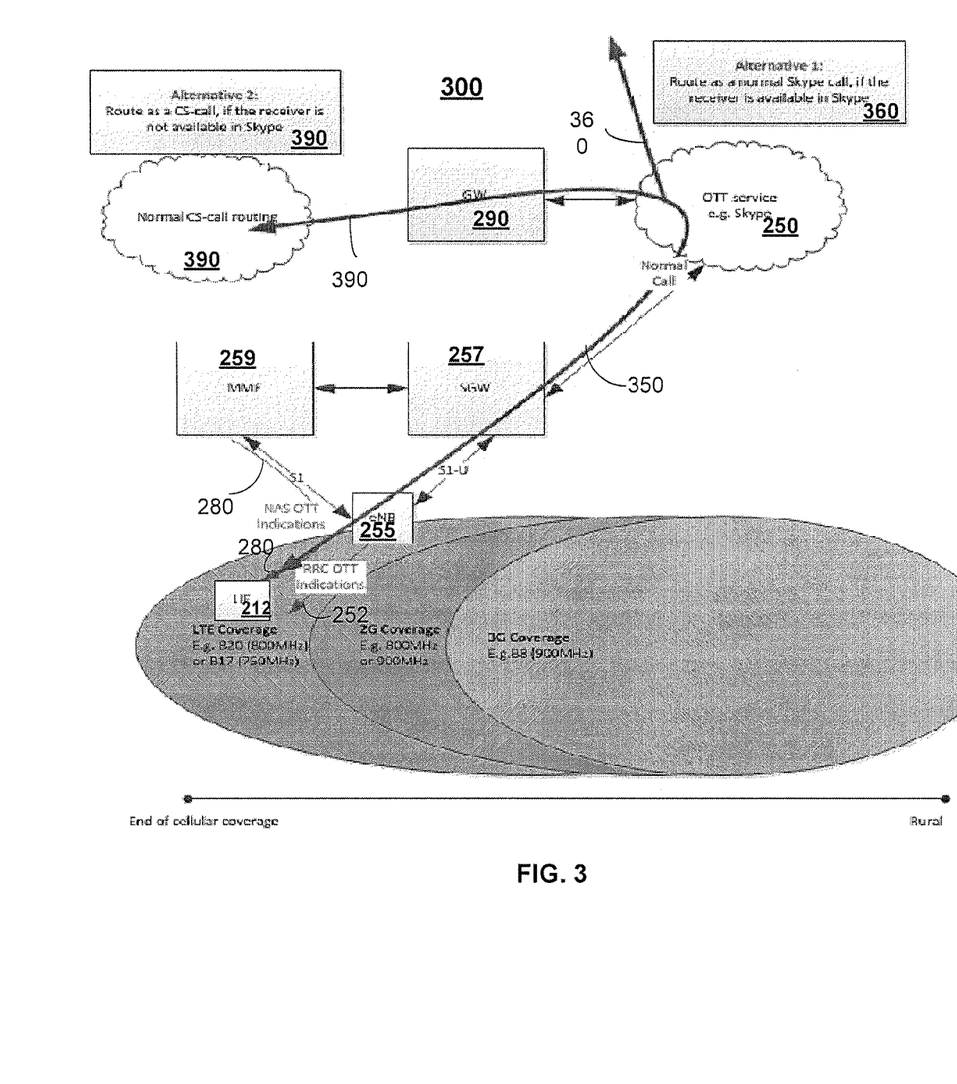
FIG. 3 depicts an example system including an OTT service in which a non-emergency call is made, in accordance with some example embodiments.

FIG. 3 depicts an example system 300 including OTT service 250, in accordance with some example embodiments. FIG. 3 is similar to FIG. 2 in some respects but depicts normal call handling 350, rather than the emergency call 260 of FIG. 2.

MME 259 may send indication 280 to the base station 255 and UE 212 that VoLTE service is not available but an over-the-top (OTT) service 250 is available in the network or cell associated with base station 255. Alternatively or additionally, the base station 255 may send to UE 212 indication 252 signaling that VoLTE service is not available but an over-the-top (OTT) service 250 is available in the network or cell being serviced by base station 255.

In response to the received signaling 252/280, UE 212 may then route voice calls, such as normal call 350, automatically and/or programmatically via OTT service 250. In the example of FIG. 3, UE 252 may route an emergency call 260 to OTT service 250 via base station 255 and SGW 257. OTT service 250 may then route the call as an OTT service call 360 to a destination when the destination also has the OTT service capability and/or route the call as a circuit switched call 290 to the destination. In some example embodiments, OTT service 250 routes the call as a circuit switched call 290 to the destination, when the destination is not available via the OTT service 360.

In the example of FIGS. 2 and 3, the signaling 252/280 is provided to UE 212 via NAS and/or radio resource control (RRC) messaging, although the information (which indicates that VoLTE service is not available and/or OTT service 250 is available) may be provided to a UE in other ways as well.

In some example embodiments, the network may signal (at for example, 252 and/or 280) the UE with a message, such as an evolved packet system (EPS) network feature support information. This signaled information may indicate whether one or more features are supported by the network. This signaling may be performed in accordance with 3GPP TS 24.301, $3^{rd}$ Generation Partnership Project; Technical Specification Group Core Network and Terminals; Non-Access-Stratum (NAS) protocol for Evolved Packet System (EPS); Stage 3 (Release 12), although other formats may be used as well. In the case of the network feature support information, the signaled information may indicate the network's capabilities with respect to VoLTE (for example, whether VoLTE is supported in a given network and/or cell(s) of the network).

In some example embodiments, if the emergency bearer services indicator (EMC BS) is not configured or set in Table 1 below, the UE may not make a VoLTE emergency call, even if VoLTE would be available. If the IMS voice over packet switched (PS) session indicator (IMS VoPS) indicator is not configured or set in Table 1 below, the VoLTE is not available at all. Both the EMC BS and IMS VoPS indicate to the UE that OTT voice service should be used at the UE, rather than VoLTE.

TABLE 1

| Bit | |
|---|---|
| IMS voice over PS session indicator (IMS VoPS) (octet 3, bit 1) | |
| 1 | |
| 0 | IMS voice over PS session in S1 mode not supported |
| 1 | IMS voice over PS session in S1 mode supported |
| Emergency bearer services indicator (EMC BS) (octet 3, bit 2) | |
| 2 | |
| 0 | emergency bearer services in S1 mode not supported |
| 1 | emergency bearer services in S1 mode supported |

In some example embodiments, the network feature support information support information may be augmented with an OTT allowed indication. The network may signal the OTT allowed indication to inform the UE regarding whether OTT services can be used instead of CSFB or VoLTE. Regarding the OTT allowed indication, the network may send to the UE the OTT allowed indication to indicate whether OTT services can be used instead of CSFB or VoLTE.

The OTT allowed indication may be signaled in a variety of ways including some of the following ways. In some example embodiments, the OTT allowed indication may be signaled via broadcasted RRC signaling, such as a System Information Broadcast (SIB). In some example embodiments, the OTT allowed indication may be signaled via dedicated radio resource control (RRC), such as a RRC Connection Release message. In some example embodiments, the OTT allowed indication may be signaled via network access stratum (NAS) signaling. For example, a so-called "master switch" indicating OTT allowed may be added to NAS-level signaling (for example, augmenting the evolved packet system (EPS) network feature support information element to include the OTT allowed indication). Alternatively or additionally, the network may provide, via RRC-level signaling in an SIB, a list of tracking areas where the OTT allowed indication is valid.

In some example embodiments, the network feature support information may be augmented with an OTT call type indication. The network may provide the OTT call type indication to signal the UE regarding whether OTT services may be used for normal calls, emergency call, or a combination of both.

Although the OTT call type indication is described in some examples as being carried by the network feature support information, the OTT call type indication may be signaled to the UE in other ways as well including the following. In some example embodiments, the OTT call type indication may be signaled via broadcasted RRC-signaling (for example, a cell wide System Information Broadcast); via dedicated RRC-signaling (for example, an RRC Connection Release in which redirection to 2G/3G may take place to perform a CSFB); and/or via NAS-signaling (for example, providing the UE with a list of allowed call types in the OTT call type indication is valid element).

Although some of the examples described herein refer to emergency calls, the examples may also be used with normal call handling as well. For example, normal, non-emergency calls may use a similar procedure as emergency calls if the normal calls are allowed by OTT call type indication. When this is the case, the IMS VoPS capability and UE VoLTE capability may also be taken into account.

Figure 4A:
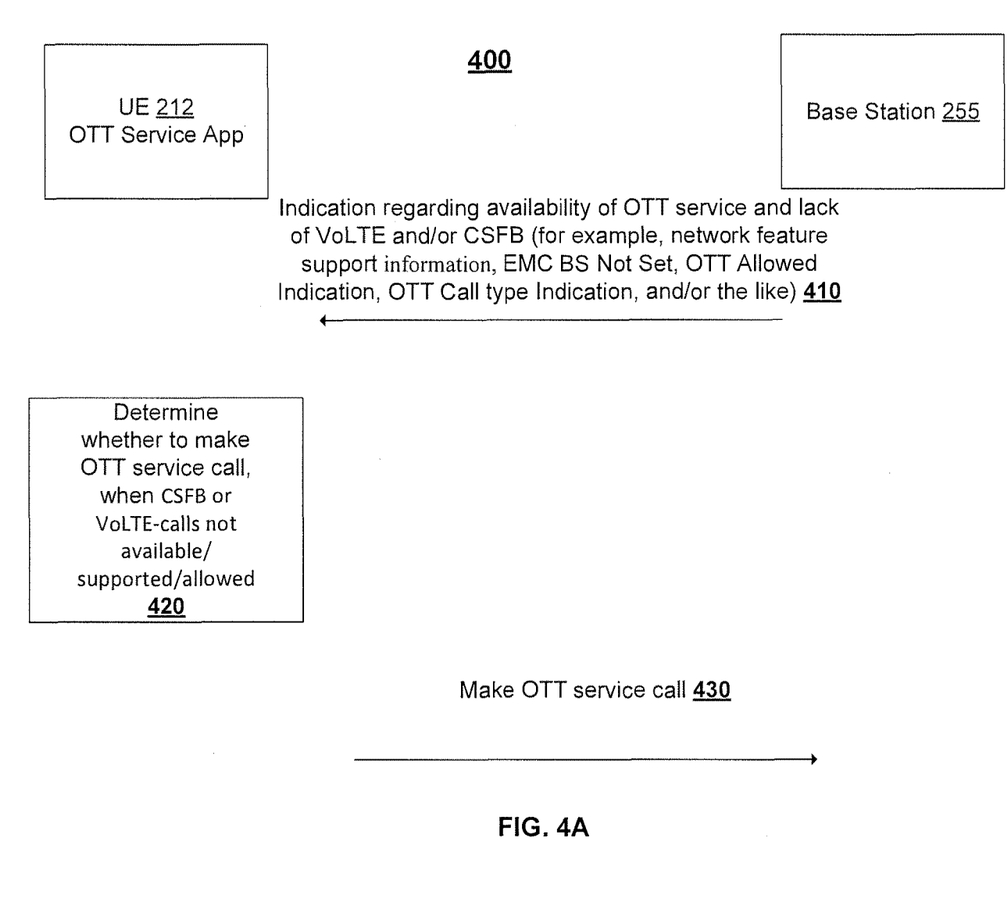
FIG. 4A and FIG. 4B depict process flow diagrams for call handling via OTT services, in accordance with some example embodiments.

FIG. 4A depicts an example process for OTT call handling, in accordance with some example embodiments. In some example embodiments, UE 212 may attempt to use OTT services 250 at the outset. For example, UE 212 may, based on signaling from the network, determine that VoLTE calls and/or CSFB calls are not possible, not available, and/or the like. When this is the case, the UE may be configured to first try the OTT service 250.

The description of FIG. 4A may also refer to FIGS. 2 and 3.

At 410, the network may send a message indicating whether VoLTE calls are possible, in accordance with some example embodiments. For example, base station 255 may signal to the UE an indication that VoLTE calls are not possible or available in the cell or network. This signaling 280/252 may be carried in a variety of ways as noted herein. Moreover, the signaling may comprise EMC BS, IMS VoPS, OTT allowed indication, OTT call type, and/or any other indication that VoLTE (and/or CSFB) is not available and/or OTT service is available, in accordance with some example embodiments.

At 420, the UE may then determine whether to make an OTT call, in accordance with some example embodiments. For example, UE 212 may determine that VoLTE and/or CSFB calls are not available or not possible in LTE RAN 110, but that OTT service is available. When this is the case, UE 212 may make, at 430, an OTT call, such as calls 260, 350, and the like, in accordance with some example embodiments. The UE 212 may also consider one or more of the following conditions before attempting the OTT service call: OTT service availability at the UE; whether the EMC BS indication has been set; lack of 2G/3G neighbors included in LTE system information (which may suggest that CSFB may not be available/possible); receipt of an OTT allowed indication; receipt of an OTT call type indication; and/or a determination that, based on location, CSFB is not working/available.

Figure 4B:
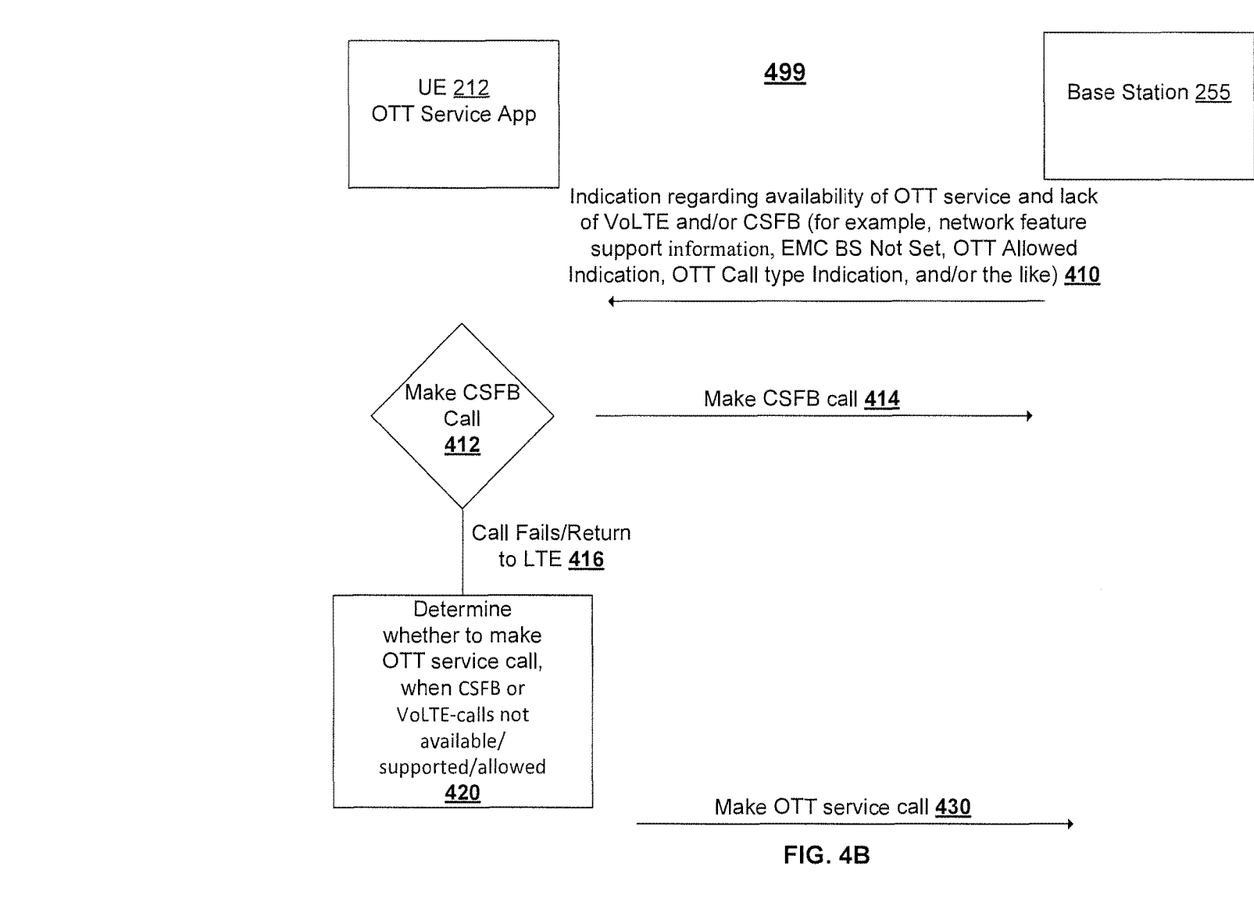

FIG. 4B depicts an example process for OTT call handling, in accordance with some example embodiments. FIG. 4B is similar to FIG. 4A in some respects, but in FIG. 4B the UE may attempt to use OTT services after the failure of another type of call, such as a CSFB call or VoLTE call that fails.

The description of FIG. 4A may also refer to FIGS. 2 and 3.

At 410, the network may send an indication indicating whether VoLTE calls are possible, as noted above with respect to FIG. 4A. At 412, the UE 212 may determine that it is in a location that VoLTE calls are not possible or available, so the UE attempts to make a CSFB call (412 and 414), in accordance with some example embodiments. If the call fails at 416, the UE may then determine whether to make an OTT call as describe above with respect to 420, and then based on the determination make the call at 430.

When carrier grade voice over cellular packet data calls, such as VoLTE calls, are not available, the UE may disable, in some example embodiments, the Evolved UMTS Terrestrial Radio Access (E-UTRA) capability, in which case the UE may move to Universal Terrestrial Radio Access Network (UTRAN) and/or GSM EDGE Radio Access Network (GERAN). When this is the case, if the ATTACH ACCEPT message or TRACKING AREA UPDATE ACCEPT message include the additional update result information element (IE) with a value of "SMS only" or "CS Fallback not preferred," the UE operating in circuit switch/packet switched (CS/PS) mode 1 may attempt to select GERAN or UTRAN radio access technology rather than Evolved-UMTS Terrestrial Radio Access Network (E-UTRAN) for the selected public land mobile network (PLMN) or equivalent PLMN. The UE may disable the E-UTRA capability but there may be a need to make one or more exceptions. For example, there may be a need to take an exception if the "OTT allowed indication" is present. Moreover, if the Attach Accept or TAU Accept is successful for Evolved Packet System (EPS) only and the EPS Mobility Management (EMM) cause received is #22 (which represents congestion) and area updating attempt counter is equal to 5, there may also be a need to make an exception if the "OTT allowed indication" is present. Furthermore if the Attach Accept or TAU Accept is successful for EPS only and the EMM cause received is #18 (which represents CS domain not available), there may be a need to make an exception if the "OTT allowed indication" is present.

It is intended that OTT-calls would be made over the default EPS bearer that is typically a non-GBR QCI9-bearer. If the operator so wishes, they could use deep packet inspection to trigger dedicated EPS bearer with appropriate TFT-filters and better QCI-class. However, this is not seen necessary, as this would be "best effort" type of solution.

Figure 5:
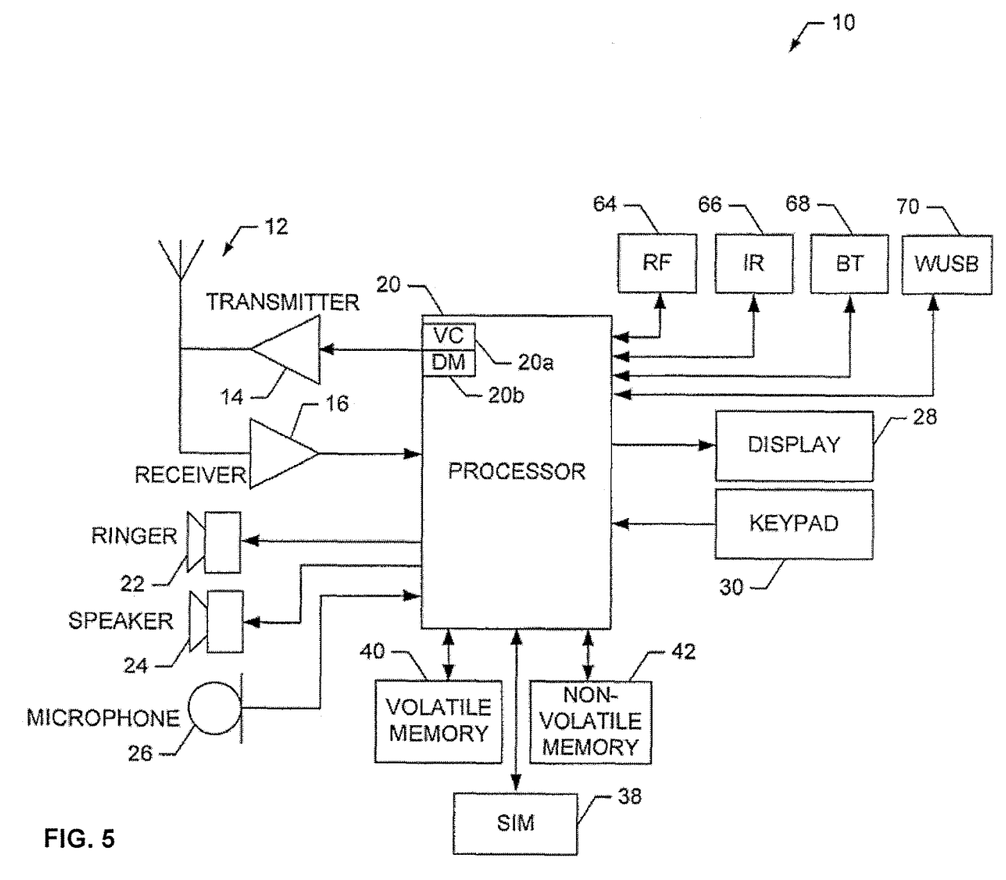
FIG. 5 depicts an example of an apparatus, in accordance with some exemplary embodiments.

FIG. 5 illustrates a block diagram of an apparatus 10, in accordance with some example embodiments. The apparatus 10 (or portions thereof) may be configured to provide a user equipment, a smartphone, a cellular phone, and/or any other wireless device or radio including user equipment 212 and/or base station 255.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 400, 499 and/or any other operations/functions disclosed herein with respect to the UE, base station, and/or any other device. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to processes 400 and/or 499 including for example receiving, at a user equipment, an indication from a network, the indication representative of at least one of whether voice over long term evolution is available at a cell serving the user equipment or whether an over-the-top service is available at the cell serving the user equipment; and initiating, by the user equipment based on the received indication from the network, a call via the over-the-top service, when the indication represents the voice over long term evolution is not available at the cell serving the user equipment and the over-the-top service is available at the cell serving the user equipment.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is call services in areas where VoLTE and CSFB are not available.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, at a user equipment, an indication from a network providing packet switched services, the indication signifying that a carrier grade voice over cellular packet data call and a circuit switched fall back call are unavailable at a cell serving the user equipment, the indication further signifying that an over-the-top service is available at the cell serving the user equipment, the carrier grade voice over cellular packet data call comprising a packet switched voice call provided over an internet protocol multimedia subsystem of the network, the circuit switched fall back call comprising a voice call provided over a circuit switched network, and the over-the-top service comprising a voice over internet protocol service provided over the network; and
   in response to the indication, initiating, by the user equipment, a call via the over-the-top service.

2. The method of claim 1, wherein the initiating the call via the over-the-top service takes places after a failure of at least one of a circuit switched fall back call or the carrier grade voice over cellular packet data call.

3. The method of claim 1, wherein the call is initiated via the over-the-top service without waiting for a failure of at least one of a circuit switched fall back call or a carrier grade voice over cellular packet data call.

4. The method of claim 1, further comprising:
   sending, by the user equipment, a position of the user equipment.

5. The method of claim 4, wherein the initiated call is an emergency call, and wherein the position of the user equipment enables routing of the emergency call to an emergency call center serving the position of the user equipment.

6. The method of claim 4, wherein the sending takes place during establishment of the over-the-top service with the user equipment.

7. The method of claim 1, wherein the received indication comprises at least one of an emergency bearer services indicator, an internet protocol multimedia system voice over packet switched session indicator, an over-the-top service allowed indicator, or an over-the-top service type indicator.

8. The method of claim 1, wherein the indication is carried by at least one of a broadcasted radio resource control signaling, a system information broadcast a dedicated radio resource control signaling, a radio resource control connection release message, or a network access stratum signaling.

9. The method of claim 1, wherein the indication is associated with a list of one or more cells in which the carrier grade voice over cellular packet data call is not available and the over-the-top service is available.

10. The method of claim 1, wherein the carrier grade voice over cellular packet data call comprises a voice over long term evolution call.

11. An apparatus, comprising:
    at least one processor; and
    at least one memory including computer program code, the at least one memory and the computer program code configured to, with the at least one processor, cause the apparatus to perform at least the following:
       receive, at the apparatus, an indication from a network providing packet switched services, the indication signifying that a carrier grade voice over cellular packet data call and a circuit switched fall back call are unavailable at a cell serving the apparatus, the indication further signifying that an over-the-top service is available at the cell serving the apparatus, the carrier grade voice over cellular packet data call comprising a packet switched voice call provided over an internet protocol multimedia subsystem of the network, the circuit switched fall back call comprising a voice call provided over a circuit switched network, and the over-the-top service comprising a voice over internet protocol service provided over the network; and
       in response to the indication, initiate, by the apparatus, a call via the over-the-top service.

12. The apparatus of claim 11, wherein the apparatus is further configured to initiate the call via the over-the-top service after a failure of at least one of a circuit switched fall back call or the carrier grade voice over cellular packet data call.

13. The apparatus of claim 11, wherein the apparatus is further configured to initiate the call via the over-the-top service without waiting for a failure of at least one of a circuit switched fall back call or a carrier grade voice over cellular packet data call.

14. The apparatus of claim 11, wherein the apparatus is further configured to send a position of the apparatus.

15. The apparatus of claim 14, wherein the initiated call is an emergency call, and wherein the position of the apparatus enables routing of the emergency call to an emergency call center serving the position of the apparatus.

16. The apparatus of claim 14, wherein the position is sent during establishment of the over-the-top service with the apparatus.

17. The apparatus of claim 11, wherein the received indication comprises at least one of an emergency bearer services indicator, an internet protocol multimedia system voice over packet switched session indicator, an over-the-top service allowed indicator, or an over-the-top service type indicator.

18. The apparatus of claim 11, wherein the indication is carried by at least one of a broadcasted radio resource control signaling, a system information broadcast a dedicated radio resource control signaling, a radio resource control connection release message, or a network access stratum signaling.

19. The apparatus of claim 11, wherein the indication is associated with a list of one or more cells in which the carrier grade voice over cellular packet data call is not available and the over-the-top service is available.

20. The apparatus of claim 11, wherein the carrier grade voice over cellular packet data call comprises a voice over long term evolution call.

* * * * *